(12) United States Patent
Taylor

(10) Patent No.: US 10,914,416 B2
(45) Date of Patent: *Feb. 9, 2021

(54) CURED IN PLACE PIPE SYSTEM HAVING INTEGRATED THERMOPLASTIC WITH IMPROVED MELT-FLOW CHARACTERISTICS

(71) Applicant: Infrastructure Technologies, LLC, Lafayette, CA (US)

(72) Inventor: Joseph Taylor, Brainerd, MN (US)

(73) Assignee: INFRASTRUCTURE TECHNOLOGIES, LLC., Layfayette, CA (US)

(*) Notice: Subject to any disclaimer, the term of this patent is extended or adjusted under 35 U.S.C. 154(b) by 205 days.

This patent is subject to a terminal disclaimer.

(21) Appl. No.: 15/614,852

(22) Filed: Jun. 6, 2017

(65) Prior Publication Data

US 2018/0003332 A1    Jan. 4, 2018

Related U.S. Application Data

(60) Provisional application No. 62/357,796, filed on Jul. 1, 2016.

(51) Int. Cl.
*F16L 55/165* (2006.01)
*B32B 27/12* (2006.01)
(Continued)

(52) U.S. Cl.
CPC .......... *F16L 55/1656* (2013.01); *B29C 63/34* (2013.01); *B32B 3/08* (2013.01); *B32B 3/20* (2013.01); *B32B 3/30* (2013.01); *B32B 5/22* (2013.01); *B32B 5/26* (2013.01); *B32B 7/02* (2013.01); *B32B 27/06* (2013.01); *B32B 27/12* (2013.01); *B32B 27/32* (2013.01); *B32B 27/34* (2013.01); *F16L 55/1653* (2013.01); *F16L 55/1654* (2013.01); *B32B 2262/02* (2013.01);
(Continued)

(58) Field of Classification Search
CPC ............... F16L 55/1656; F16L 55/1653; F16L 55/1654; B29C 63/34; B32B 27/12
USPC ......................................................... 138/98
See application file for complete search history.

(56) References Cited

U.S. PATENT DOCUMENTS 5,836,357 A * 11/1998 Kittson ................. B29C 53/382
138/98
5,971,029 A * 10/1999 Smith ..................... F16L 11/20
138/98

(Continued)

*Primary Examiner* — Craig M Schneider
*Assistant Examiner* — David R Deal
(74) *Attorney, Agent, or Firm* — Carla Gannon Law

(57) ABSTRACT

A Cured In Place Pipe System includes a tubular substrate constructed of needle-punched fibers of carbon, aramid and thermoplastic. The tubular structure defines a longitudinal channel running along the length. Within the channel is an air bladder, preferably including an air duct. The tubular substrate is enclosed within a loose-fitting protective film. The tube is preferably constructed with multiple overlapping layers that aren't permanently bound, thereby allowing for circumferential expansion to accommodate various host pipe sizes, shapes, and configurations. The integrated thermoplastic has a melt/flow point of approximately 300-342° F., a cure point of approximately 330-370° F., and bonding point of approximately 372-412° F. at approximately 5-20 psi.

6 Claims, 14 Drawing Sheets

(51) Int. Cl.
*B29C 63/34* (2006.01)
*B32B 3/30* (2006.01)
*B32B 27/06* (2006.01)
*B32B 5/22* (2006.01)
*B32B 27/34* (2006.01)
*B32B 3/08* (2006.01)
*B32B 7/02* (2019.01)
*B32B 5/26* (2006.01)
*B32B 3/20* (2006.01)
*B32B 27/32* (2006.01)

(52) U.S. Cl.
CPC .............. *B32B 2262/0253* (2013.01); *B32B 2262/0269* (2013.01); *B32B 2262/101* (2013.01); *B32B 2262/14* (2013.01); *B32B 2307/718* (2013.01); *B32B 2307/732* (2013.01); *B32B 2597/00* (2013.01)

(56) References Cited

U.S. PATENT DOCUMENTS

| | | | |
|---|---|---|---|
| 6,019,136 A * | 2/2000 | Walsh | F16L 55/163 138/168 |
| 7,135,087 B2 * | 11/2006 | Blackmore | E03F 3/06 156/293 |
| 8,851,098 B2 * | 10/2014 | Thomas | B60P 3/2295 137/15.11 |
| 2003/0234057 A1 * | 12/2003 | Woolstencroft | F16L 55/1656 138/125 |
| 2007/0003648 A1 * | 1/2007 | Weatherby | F16L 55/1653 425/11 |
| 2008/0277012 A1 * | 11/2008 | Anders | F16L 55/1651 138/98 |
| 2009/0194184 A1 * | 8/2009 | Kiest, Jr. | F16L 55/163 138/98 |
| 2010/0012214 A1 * | 1/2010 | Kamiyama | F16L 55/1654 138/98 |
| 2011/0083766 A1 * | 4/2011 | Anders | F16L 55/1651 138/98 |
| 2011/0297243 A1 * | 12/2011 | Kiest, Jr. | F16L 55/1645 137/15.08 |
| 2014/0116557 A1 * | 5/2014 | Bichler | B32B 27/12 138/98 |
| 2015/0068632 A1 * | 3/2015 | Onishi | B29C 63/34 138/97 |

\* cited by examiner

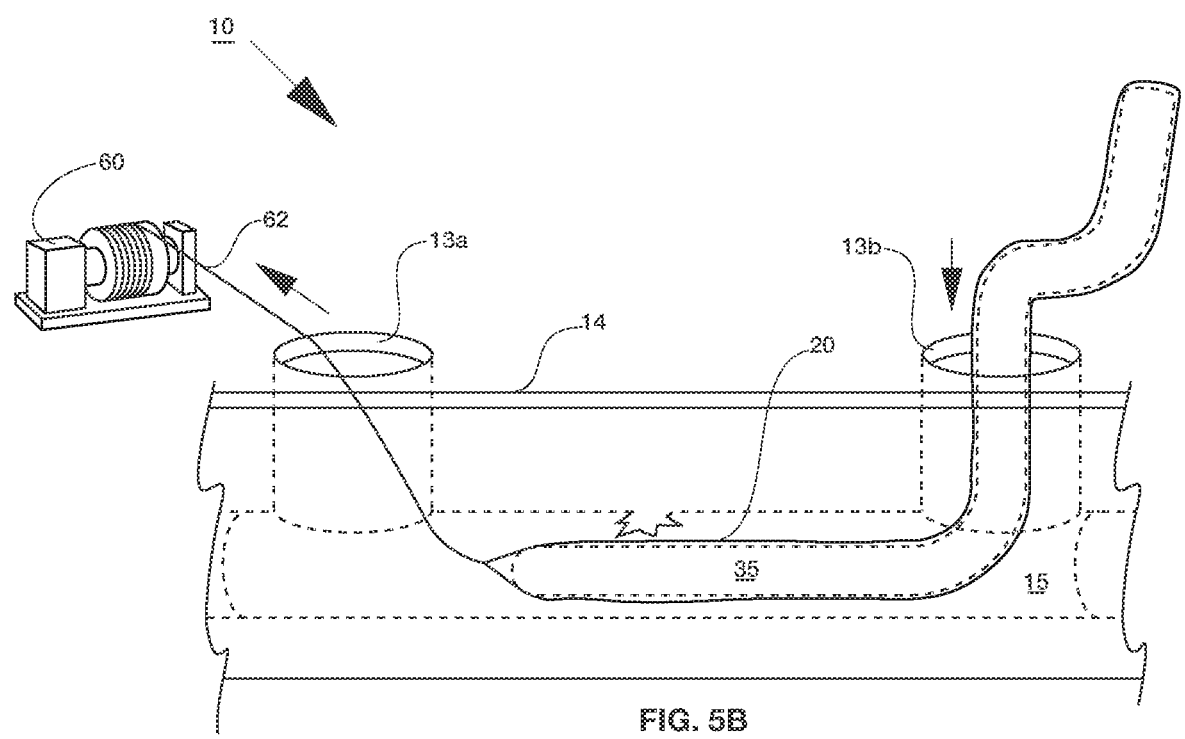

CURED IN PLACE PIPE SYSTEM HAVING INTEGRATED THERMOPLASTIC WITH IMPROVED MELT-FLOW CHARACTERISTICS

CROSS-REFERENCE TO RELATED APPLICATIONS

This application claims the benefit of U.S. Provisional Application 62/357,796, filed on Jul. 1, 2016, which is hereby incorporated by reference in its entirety.

BACKGROUND OF THE INVENTION

The present invention relates generally to a pipe repair and reinforcement system, and more particularly, to an improved Cured In Place Pipe (CIPP) system.

The nation's infrastructure such as roads, bridges, and underwater pipes is aging. Many urban areas have underground pipes that have been around for more than a century, and much of the nation's infrastructure was built in the post-World War II era, which puts these systems at 50 or more years old. The emphasis since the infrastructure building boom has generally been on expansion, not replacement and upgrade. Given the age and lack of upkeep, it is not surprising that the infrastructure has often critically deteriorated. This is particularly true for underground and underwater pipes, such as potable drinking water, sewage, storm drains, oil, gas and other petroleum bas product lines, and supply lines for specific industries such as pulp and paper mills. Underground and underwater pipes are difficult to inspect and deterioration is difficult to ascertain. Unfortunately, catastrophic pipe failure is often the first warning of the deteriorating condition of a pipe system.

Traditional methods of replacing a pipe and/or pipe sections require digging to access the pipe, removal of the old pipe, putting in new pipe, and tying new pipe into existing structures. This is cumbersome and expensive. More recently, trenchless pipe repair technology has developed. These systems are advantageous insofar as they don't require extensive digging. One trenchless system is the Cured In Place Pipe ("CIPP"). An example of this comprises a felt tube with 2 or more layers that is vacuum impregnated with a polyester resin, with the last layer of felt being coated with an extruded film of polyurethane or polypropylene to encapsulate the resin during the impregnation process. In use the resin impregnated felt tube with polyester resin is inverted into an existing pipe, and the coated layer which was the outside layer now serves as a bladder and is filled with water or air. The filling bladder in turn expands the resin-impregnated tube to fit the shape of the existing pipe. Pressure is held until the tube is solidified and a new pipe is created on the inside of the old pipe. This technology typically relies on a material substrate such as felt that is essentially a sponge that acts as a carrier for the resin and aims to prevent the resin from running down to the bottom of the pipe via gravity during pipe installation. In other variations, curing is facilitated by UV light, or by an air bladder having heated air.

Unfortunately, however, the material substrate does not provide strength and corrosive resistance properties. Additionally, the resin is very heavy, which adds to the costs of shipping, transportation to jobsite, and labor. Also, these material substrates have a shelf life of approximately four weeks to one year after resin impregnation, thereby placing time constraints on the end user with respect to ordering and storage. Finally, even the most sophisticated of these systems cure at approximately 105 psi, which is not only cumbersome to achieve in the field, it is dangerous given critically disintegrated pipes often can't withstand pressures of beyond approximately 20 psi.

Thus, there remains a need for a new and improved lining system without the mess, cost and weight of resin impregnation. It is desirable that this system has a shelf life significantly longer than one year. Moreover, it is preferred that the thermoplastic cures at a relatively low pressure.

SUMMARY OF THE INVENTION

The present invention pertains to an improved CIPP system with integrated thermoplastic, having a long shelf life, and that cures at a relatively low pressure.

The lining system of the present invention generally includes a carbon composite tubular substrate defining a longitudinal channel running along the length. Within the channel is an air bladder, preferably including an air duct. The tubular substrate is enclosed within a loose-fitting protective film.

The carbon composite tubular substrate includes fibers of carbon, aramid and thermoplastic which have been needle punched together. The tube is can be stitched or seamed if there is very little variance of the host pipe, however an overlap seam allows for circumferential expansion to accommodate the size and shape of the host pipe and is preferred. An outer plastic film encapsulates the tubular structure to protect it from contamination by the host pipe during installation. The thermoplastic of the present invention has a melt/flow point of approximately 300-342° F., a cure point of approximately 330-370° F., and bonding point of approximately 372-412° F. at approximately 5-20 psi.

In use, the entire pipe or a segment of pipe to be repaired or reinforced is identified, and access points are established upstream and downstream of the pipe segment. The lining system is introduced into the host pipe, the bladder is pumped with hot air, and the thermoplastic of the tubular substrate melts, carbon and aramid fibers bond, and the thermoplastic cures. The bladder is removed, ends of the cured lining system are cut, and the newly reinforced portions are connected to the existing upstream and downstream host pipe. Pipe flow is then resumed.

These and other aspects of the present inventions will become apparent to those skilled in the art after a reading of the following description of the preferred embodiment when considered with the drawings.

BRIEF DESCRIPTION OF THE DRAWINGS

FIG. 4—depicts some major steps of the manufacturing process:
FIG. 5—depicts some major steps of use:
FIG. 5b—depicts pulling the lining system through the pipe with a winch;

DETAILED DESCRIPTION OF THE INVENTION

The following detailed description is of the best currently contemplated modes of carrying out exemplary embodiments of the invention. The description is not to be taken in a limiting sense, but rather it illustrates the general principles of the invention, with the scope of the invention set forth in the appended claims.

The following structure numbers shall apply to the following structures among the various figures:
10—lining system;
12—manhole cover;
13—access;
13a—first access;
13b—second access;
14—ground;
15—pipe;
16—fluid;
17—compromised portion;
18—repaired portion;
20—film;
30—flat substrate;
32—fibers;
34—needle punches;
35—tubular substrate;
36—longitudinal edges;
37—overlapping portion;
40—bladder;
41—string;
45—channel;
50—air duct;
55—perforations;
60—winch;
62—winch line;
70—blower;
71—end cap;
72—air;
73—air intake;
74—pressure hose;
75—exhaust assembly;
76—outlet;
77—gauge; and
80—cut end.

Figure 1:
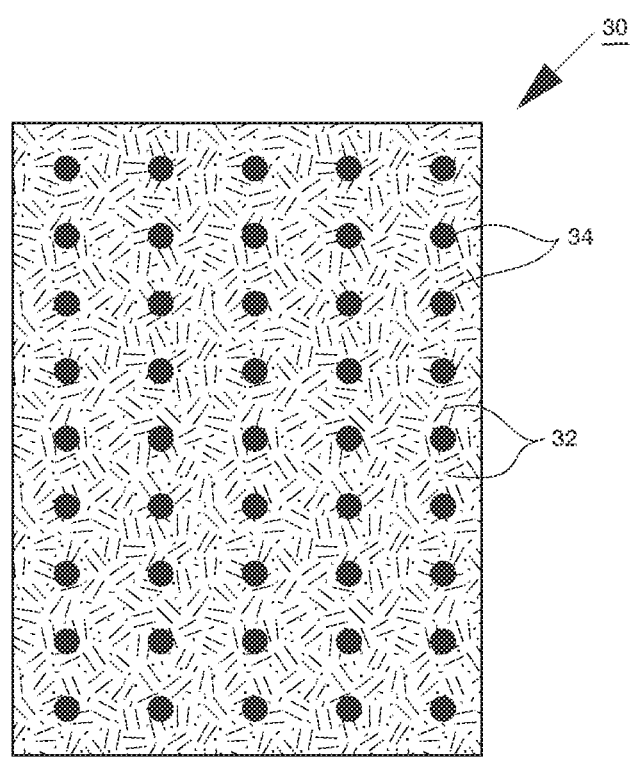
FIG. 1—depicts the needle punched flat substrate.
Figure 2:
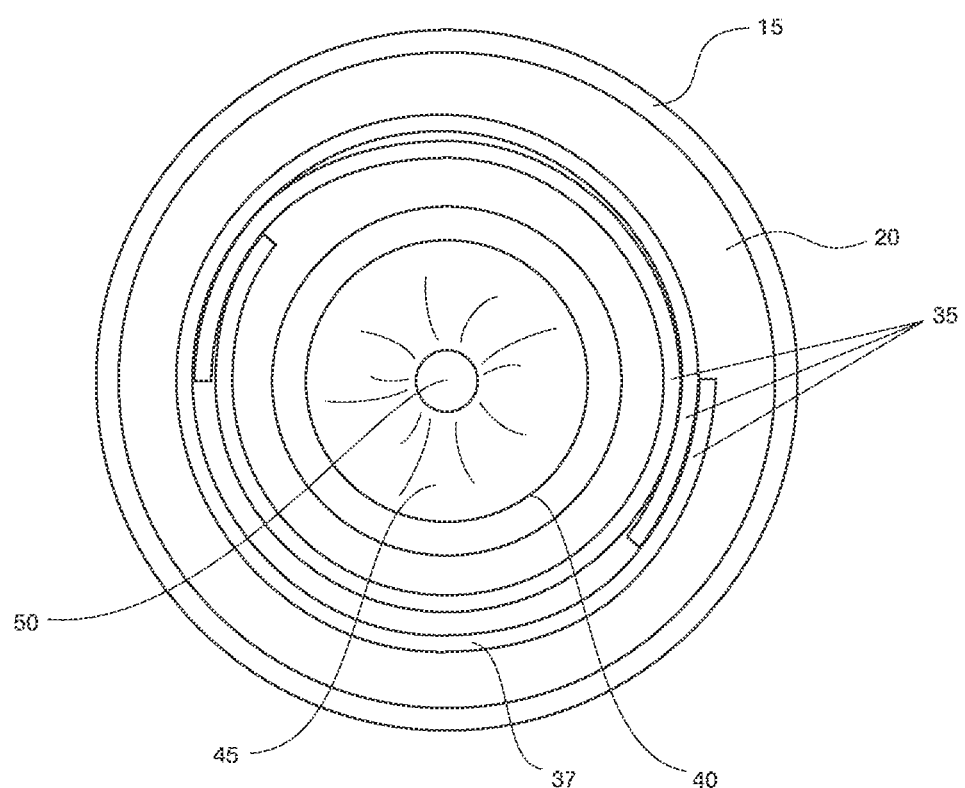
FIG. 2—depicts a cross-section view of the pipe and lining system.
Figure 3:
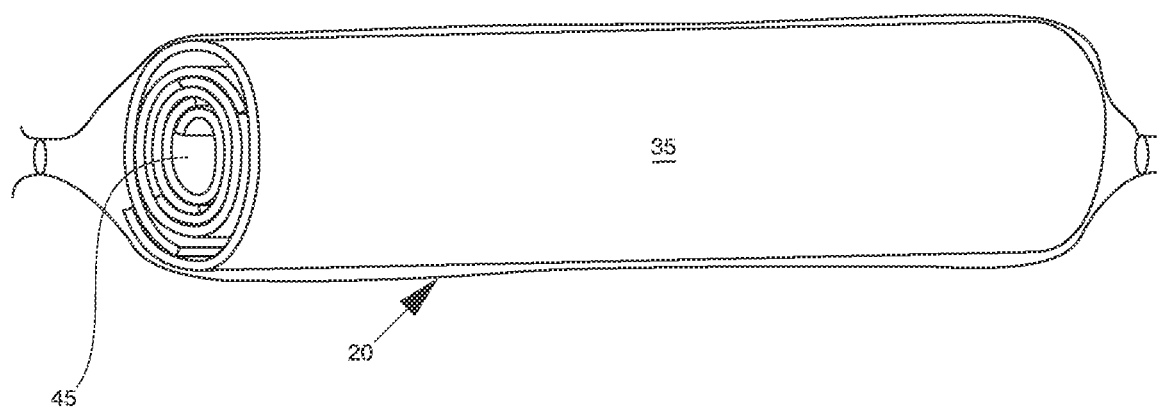
FIG. 3—depicts the tubular substrate encapsulated in the film.

Referring to FIG. 1, fibers 32 of carbon, aramid and thermoplastic are needle punched together to form flat substrate 30. The carbon fibers are preferably recycled or reclaimed fibers, having a length of approximately 1" to 4", and thickness of approximately 0.31 mm to 1 mm. An example of a commercially available carbon fiber suitable for use is Tenax UMS40 from Toho Tenax of Rockwood, Tenn. The aramid fibers preferably have a length of approximately 1" to 4", and thickness of approximately 0.31 mm to 1 mm. An example of a commercially available aramid fiber suitable for use is KEVLAR K29 AP from DuPont of North America. The thermoplastic fibers preferably have a length of approximately 6 mm to 2500 mm, and thickness of approximately 0.31 mm to 1 mm.

The thermoplastic of the present invention is polypropylene, with an example of a commercially available polypropylene thermoplastic being Hyperform HPN-68L from Milliken of Spartanburg, S.C., USA having approximately 309 to 400 degree melt and cure points at a pressure of approximately 5 to 20 psi.

The proportion of carbon fibers in the flat substrate is approximately 10 to 60% by weight. The proportion of aramid fibers in the flat substrate is approximately 0 to 15% by weight. The preferred proportion of fibers in the flat substrate is approximately 40% carbon, 0% aramid, and 60% thermoplastic, by weight.

Fibers are needle punched together by conventional methods in a directional format. However, other combinations are also suitable. Flat substrate 30 can be produced in a variety of thicknesses, typically approximately 1.5 mm-9.0 mm, as appropriate for the specific application. Flat substrate is preferably spooled for subsequent use.

Figure 4A:
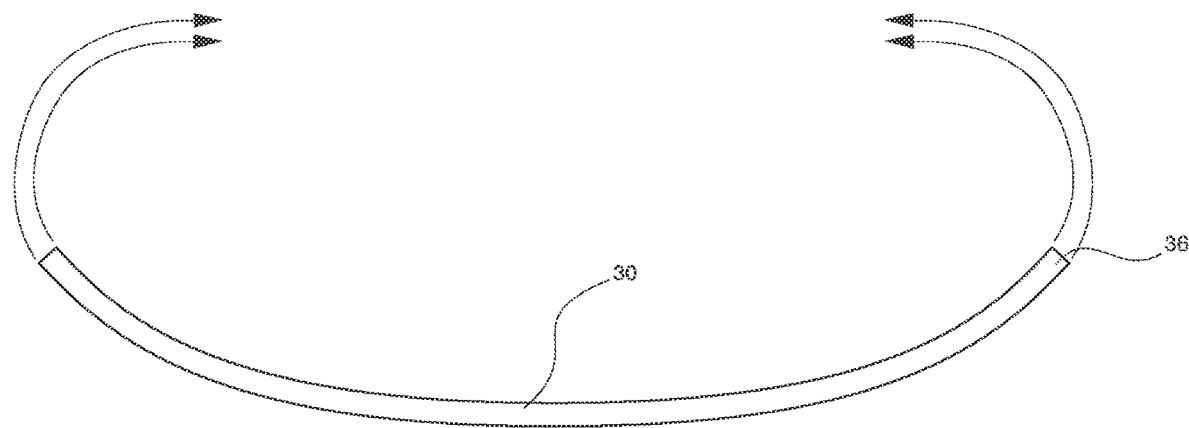
FIG. 4a—depicts the flat substrate being curled.
Figure 4B:
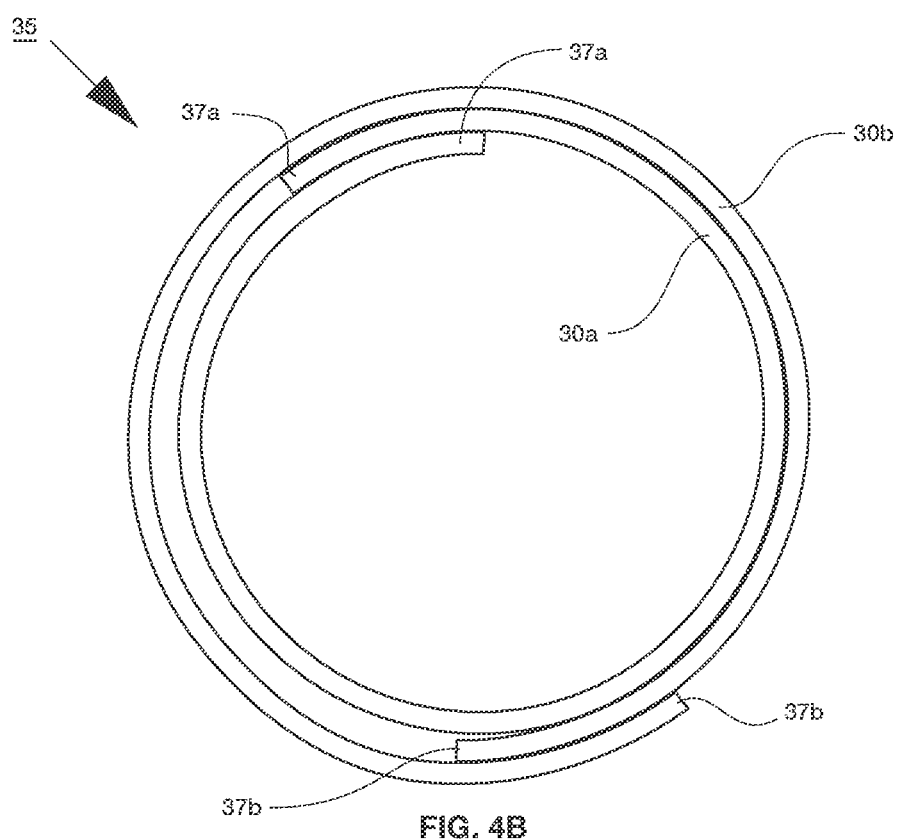
FIG. 4b—depicts forming the tubular substrate.

To form tubular substrate 35, flat substrate 30 is unwound from the spool typically using a mandrel or airshaft. Referring to FIG. 4A, longitudinal edges 36 of flat substrate 30 are brought together to form a tube with overlapping edges 37. In FIG. 4B, tubular substrate 35 is formed of two flat substrates, 30a and 30b, with corresponding overlapping portions 37a, 37a and 37b, 37b. It is preferred that overlapping portions of each flat substrate is offset approximately 180° relative to other overlapping portions. Said another way, it is desirable that 37a, 37a are approximately 180° from 37b, 37b. It is desirable that longitudinal edges overlap by at least two inches after it has expanded to the host pipe. Typically a two inch overlap after expansion requires an overlap of at least 4 inches during manufacturing, although this would vary according to the specific application. The number of layers of flat substrate 30 depends on the end use application, but 1-12 layers are preferred.

It should be noted that the flat substrates comprising the tubular substrate are independent of each other, and are preferably not permanently or semi-permanently attached to each other through adhesives, stitching, mechanical or frictional cinching devices, or the like. This allows the lining system to slide and expand to accommodate the size and shape of the host pipe. It is important that the width of overlapping portions are properly calculated, so as to prevent expansion in use that would create a void or gap between layers.

The quantity, orientation and thickness of flat substrates 30 in lining system 10 will depend on the end use specifications. By way of example, a lining system for a host pipe having a 24" diameter and 2" overlap on each longitudinal edge would require a flat substrate having a width approximately 79.4". This is calculated as the diameter of the host pipe (24") multiplied by pi (3.14), plus total overlap (4"):

Width of Flat Substrate=(Diameter×π)+Overlap

Figure 4C:
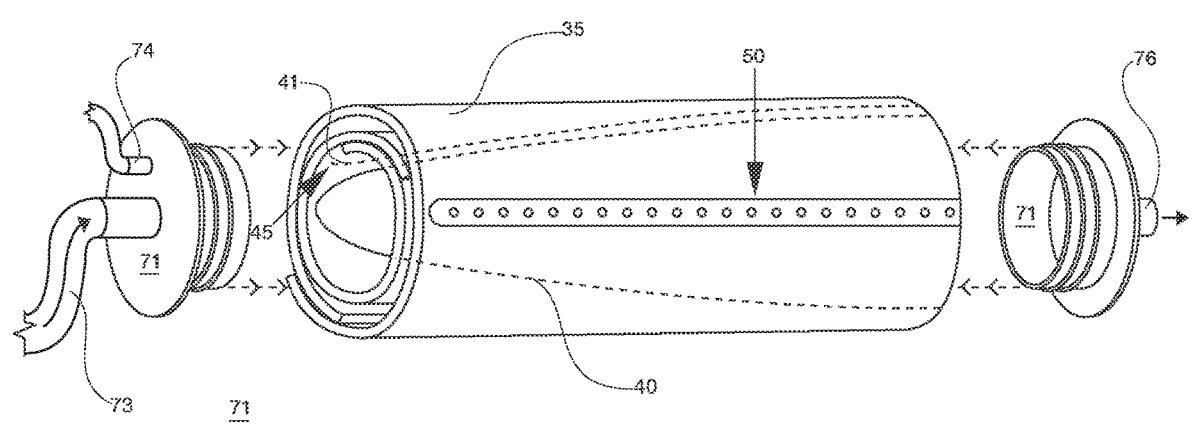
FIG. 4c—depicts the bladder and air duct inside the pipe channel.

Referring to FIG. 4C, tubular substrate 35 defines channel 45, which receives bladder 40 including air duct 50. Bladder 40 is preferably constructed of an airtight, temperature and pressure resistant material such as Colamin 110 C with a PA/PP configuration, a thickness of 110 μm, and weight of 116 g/m$^2$, from Obermuhle Polymertechnik GmbH of Germany. End caps 71 are fabricated to a specific size to allow the bladder to slip over the outer diameter of the end cap. The shape of the end cap is a short hollow cylinder about 2 feet in length with one end open and one end closed. The bladder is equal to the same length of the tubular substrate in which both are slipped over the open side of the end caps and banded tightly to ensure that when compressed air is supplied to the end cap, the bladder will inflate causing the tubular substrate to expand to fit the host pipe. Intake end cap 71 includes air intake 73, and pressure hose 74 that attaches to pressure gauge 77. Exhaust end cap 71 includes outlet 76. The valves can be any fitting used to for compressed air hoses and can be purchased at any hardware store. Bladder preferably includes internally located air duct 50 which comprises a plurality of air outlets that facilitate uniform distribution of hot air along length of lining system during inflation, heating and pressurizing. In a preferred embodiment, at least one string 41 is inserted into channel during production for later attachment to bladder 40. By way of example, string may attached to bladder 40 for positioning uninflated bladder within host pipe prior to inflation, and/or prior to removal of deflated bladder following curing or lining system. String 41 may be positioned at, and connected to, far end of bladder in order to facilitate inverted removal of bladder, where bladder turns inside out and travels over itself to come out.

Figure 4D:
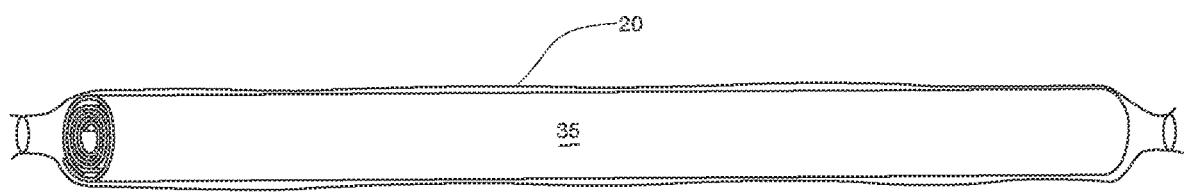
FIG. 4d—depicts the tubular substrate encapsulated in film.

As depicted in FIG. 4D, tubular substrate 35, including internal bladder 40 and air duct 50 (not shown), is completely encased in film 20. The film protects the tubular substrate from host pipe contamination by providing a physical barrier. The circumference of the film is slightly greater than the circumference of the tubular substrate that it is encasing, thereby allowing expansion of the tubular structure during the installation process. The circumference difference between the film and tubular structure will depend on the specifications and host pipe size of a particular application. Film 20 is preferably constructed of an airtight, temperature and pressure resistant material such as Colamin 110 C with a PA/PP configuration, a thickness of 110 μm, and weight of 116 g/m$^2$, from Obermuhle Polymertechnik GmbH of Germany. The length of the bladder is preferably approximately equal in length to the liner. This allows the user to attach the same amount of bladder and liner material onto the end caps. In a preferred method, the end caps are inserted into the bladder which is encapsulated by the tubular substrate and both are clamped or banded tightly around the outer diameter of the end cap. This ensures that when the compressed air hose is connected to the valve on the enclosed side of the end cap, the bladder will inflate causing the liner material to stretch and fit to the host pipe.

Because lining system 10 doesn't include a wet resin, the resulting product is lighter, less messy, and easier to transport. By way of example, the commercially available product of 24"×21 mm inversion liner from Liner Products of Paoli, Ind. weighs approximately 27 pounds per foot, while the present invention weighs approximately 2 pounds per foot. Produced lining systems can be stacked, stored for extended periods of time, and shipped as needed.

Figure 5A:
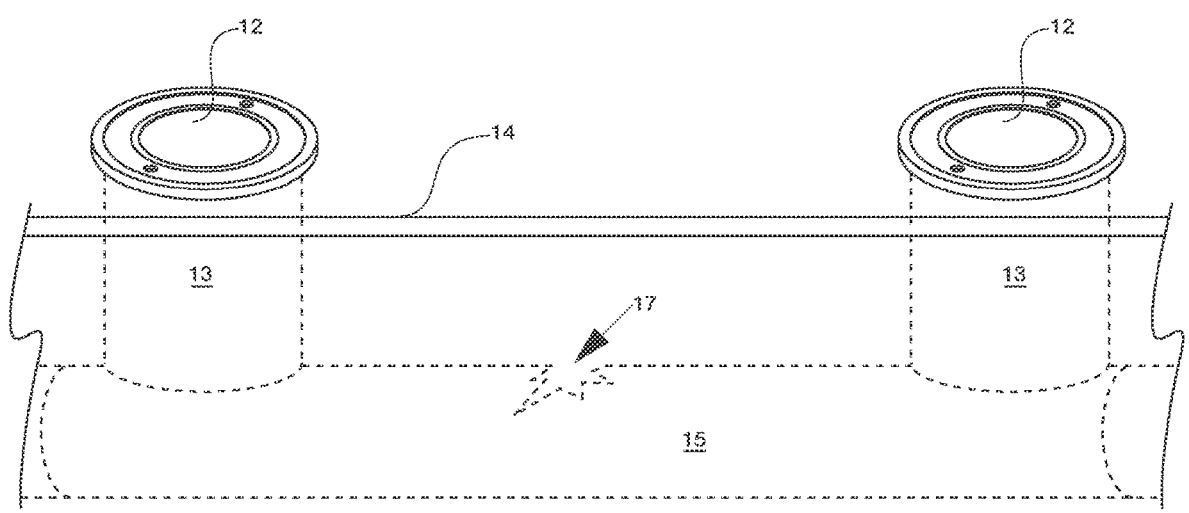
FIG. 5a—depicts the broken pipe.

The general steps of use are set forth in FIGS. 5A-5G. FIG. 5A depicts pre-existing underground pipe 15 having compromised portion 17. Pipe 15 is beneath ground 14, and accessible upstream and downstream of compromised portion 17 by accesses 13, 13. In this depiction accesses are manholes, which include manhole covers 12, although it should be understood that a variety of accesses could be used with the present invention, including pre-existing accesses and accesses which are created for pipe repair and reinforcement.

FIG. 5B depicts positioning lining system 10 within existing pipe 15. In a preferred method, winch line 62 is fed into a first access 13a and out second access 13b, where winch line is attached to end of lining system 10, then pulled by winch 60 from second access 13b towards first access 13a. Positioning may be assisted by string 41, shown in FIG. 4C.

Figure 5C:
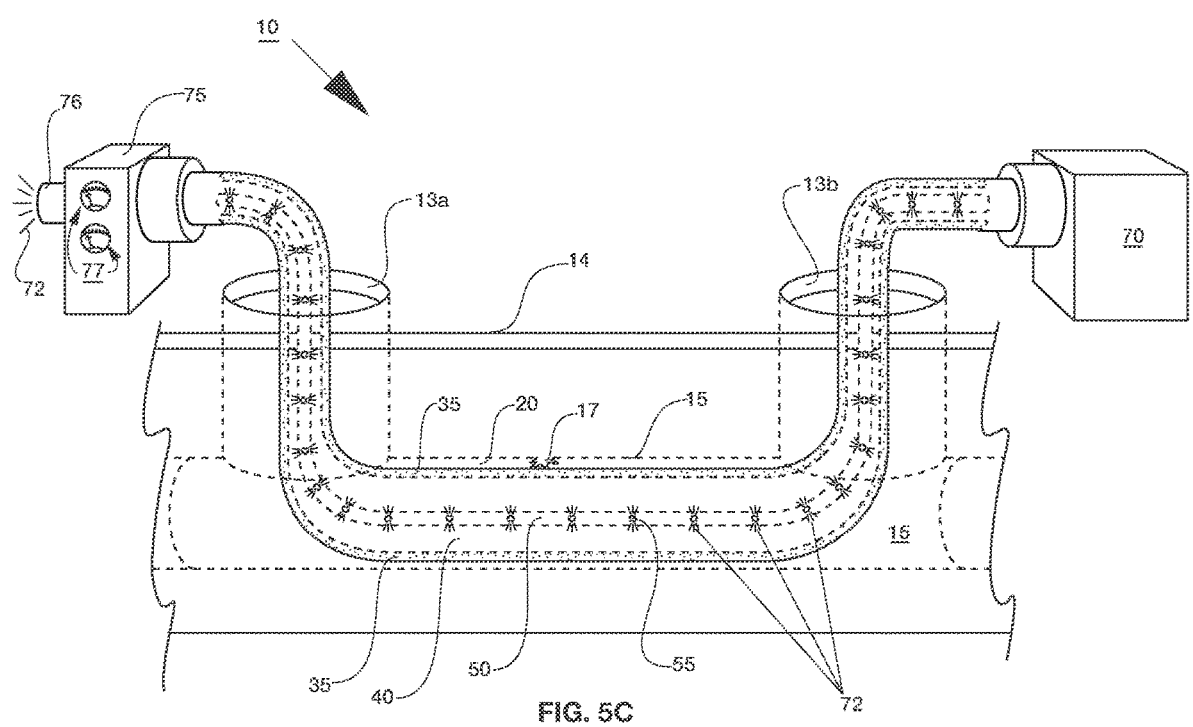
FIG. 5c—depicts inflation of the bladder.

As shown in FIG. 5C, properly positioned lining system 10 preferably protrudes from accesses, with the specific dimensions of protrusion varying from approximately 2 to 5 feet, depending on factors such as pipe size, configuration of accesses, and so forth. Exhaust assembly 75 is connected at one end of lining system 10, and blower 70 is connected at the other end. Exhaust assembly 75 includes outlet 76, out of which air 72 exits, and gauges 77 measuring parameters such as air pressure, time and temperature. In a preferred embodiment gauges 77 automatically control outlet 76 to ensure temperature and pressure are maintained for the desired amount of time in order to cure lining system 10 properly and safely. The specifications of blower 70 can vary according to the specific application, but an example of a suitable commercially available blower is as DTLF 400/0-69 from Becker of Germany, which can blow approximately 363-448 m$^3$ of air per hour at ambient temperature with 2000 mbar of pressure.

Superheated hot air is blown from blower 70 into bladder 40, thereby expanding bladder to fit size and shape of host pipe. Air duct 50 within bladder 40 defines a plurality of perforations 55 to evenly distribute air 72 along entire length of bladder. Expanding bladder causes tubular substrate 35 surrounding the bladder to likewise expand to generally fit the size and shape of the host pipe. This circumferential expansion is possible because overlapping portions 37 are able to move relative to each other. Expanding bladder and tubular substrate "fill out" surrounding film 20, but film is sized to accommodate expansion and remains intact.

Superheated hot air is blown at a temperature, pressure and duration adequate for curing. Although these parameters will vary a bit depending on application, specific composition of fibers in flat substrate, and other factors, it is preferred that the air is approximately 380-470° F., at a pressure of approximately 5-20 psi, for approximately 5 to 90 minutes. The superheated hot air blowing parameters can be manipulated in order to achieve the desired chemical reactions. By way of example, the thermoplastic preferably has a melt/flow rate of approximately 320-322° F. at a pressure of 5 to 105 psi for 5 to 90 minutes; a cure point of approximately 350° F. at a pressure of 5 to 105 psi for 5 to 90 minutes; and the carbon and aramid preferably have a bonding temperature of approximately 392° F. at a pressure of 5 to 105 psi for 5 to 90 minutes. The temperature and pressure can be "held" at various levels as desired.

Figure 5D:
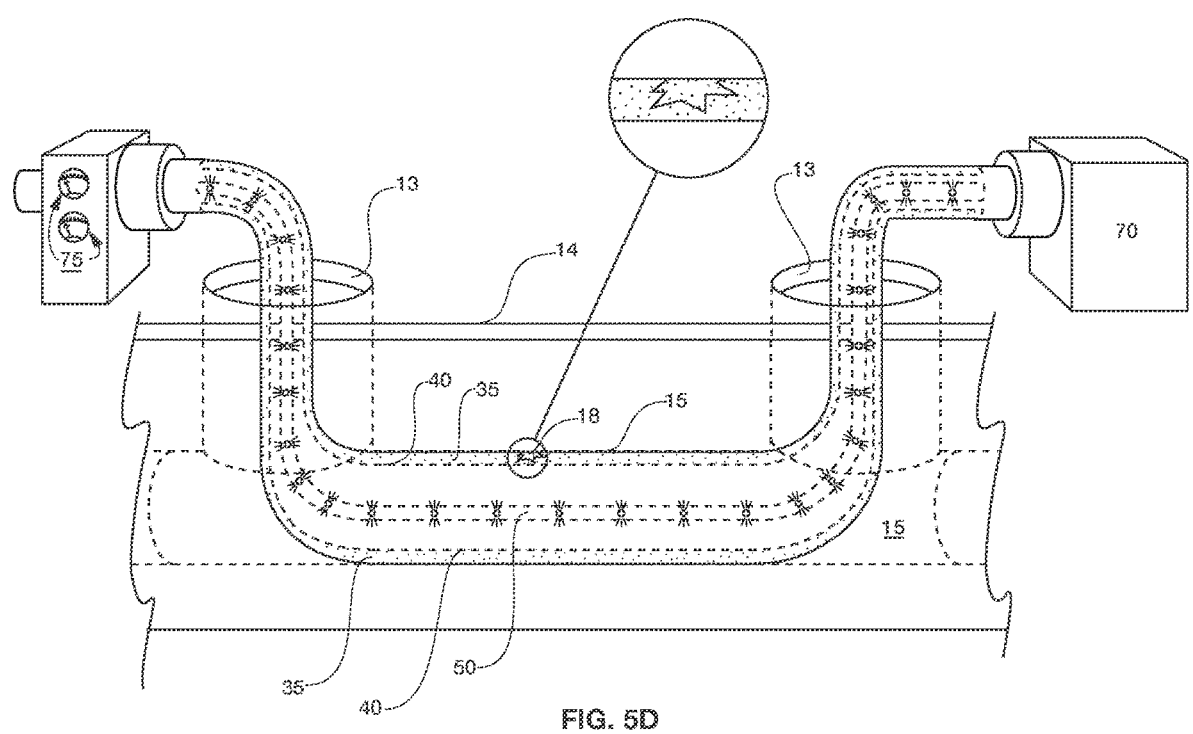
FIG. 5d—depicts curing of the liner.

As shown in FIG. 5D, cured tubular substrate 35 presses against host pipe 15, thereby creating repaired portion 18 where damage previously existed. Host pipe with cured tubular substrate is also reinforced. Although not shown in FIG. 5D, film 20 remains between pipe 15 and cured tubular substrate 35.

Figure 5E:
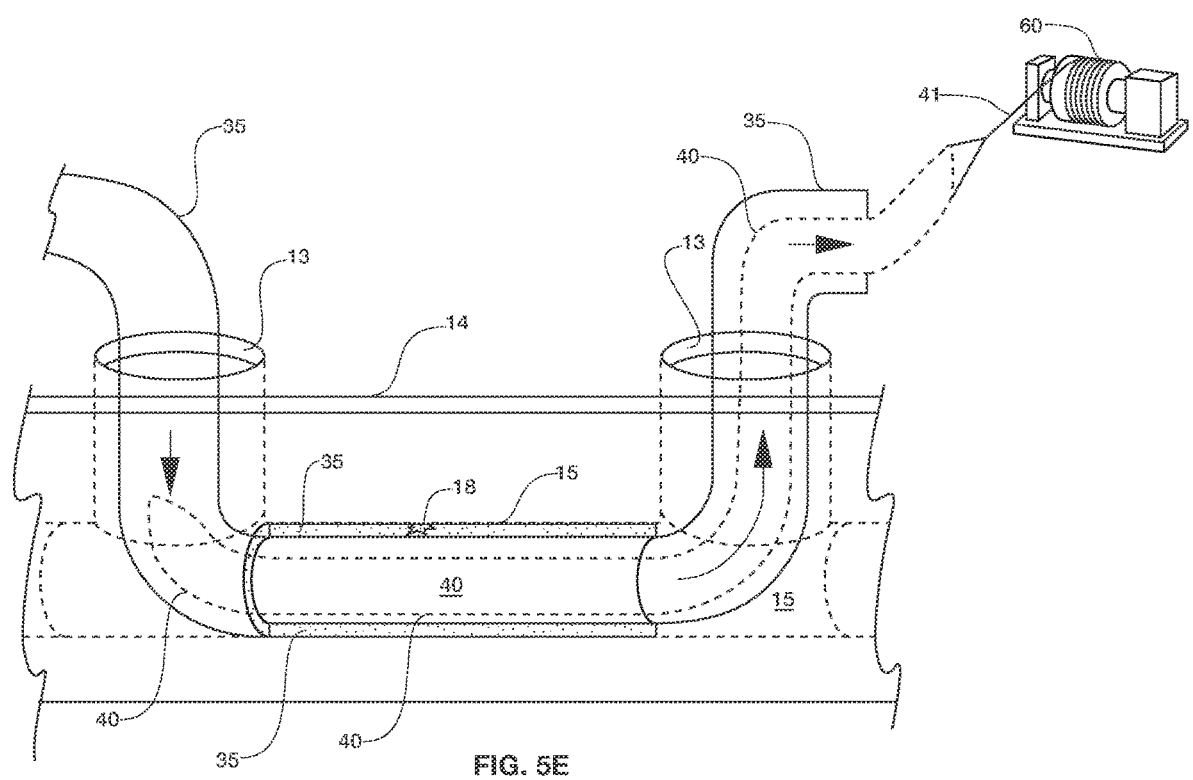
FIG. 5e—depicts removal of the bladder.

Referring to FIG. 5E, bladder 40 is allowed to deflate, and then pulled out through access 13 by winch 60. Note that cured tubular substrate 35 (and unshown film 20) remains within pipe 15. Air duct 50 may be manually removed from bladder prior to removing bladder, or they may be removed together. String 41 of FIG. 4C may be used to assist removal of bladder.

Figure 5F:
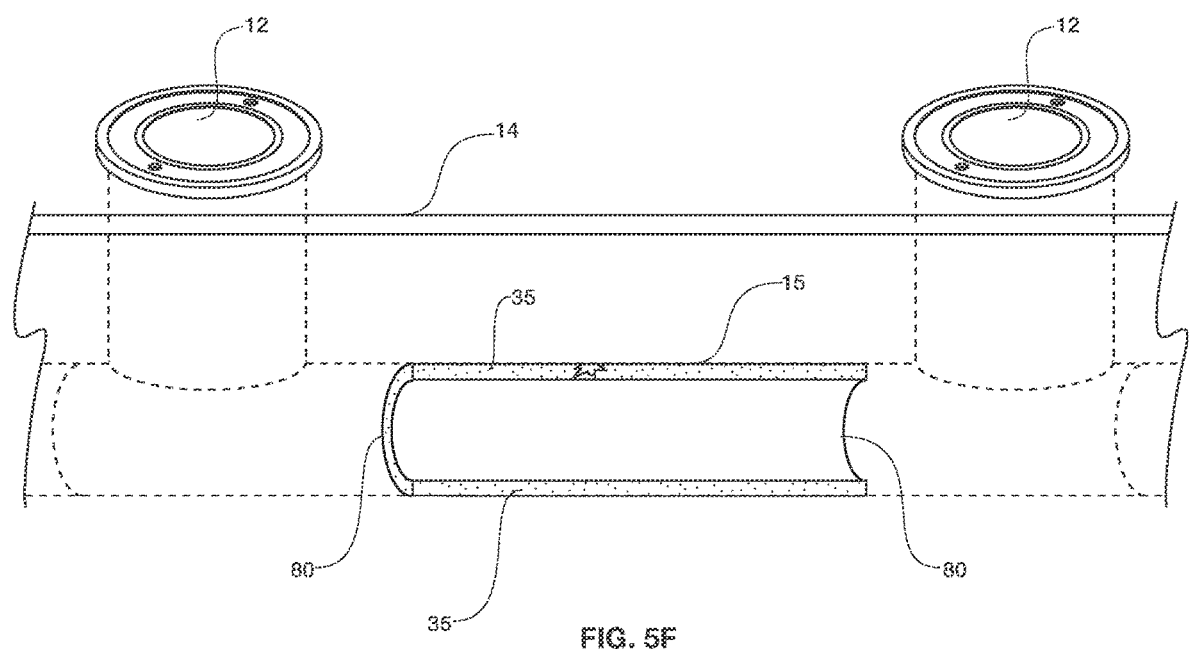
FIG. 5f—depicts cutting and finishing of the liner.
Figure 5G:
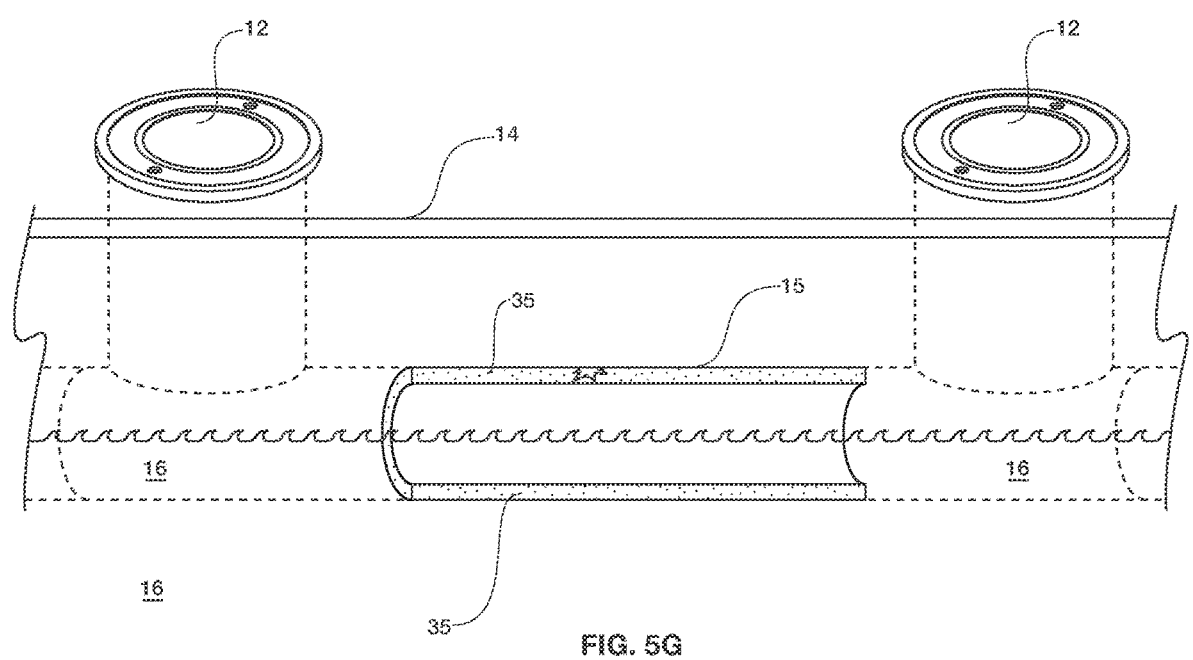
FIG. 5g—depicts resuming fluid flow through the repaired pipe.

After curing and removal of bladder, ends are flush cut and cut ends 80 are integrated with existing pipe structure through patching, connectors, or other methods. This is depicted in FIG. 5F. As shown in FIG. 5G, flow of fluid 16 is allowed to resume, manhole covers 12 are replaced, and repaired and reinforced system is fully functional.

Certain modifications and improvements will occur to those skilled in the art upon a reading of the foregoing description. By way of example, it should be understood that all such modifications and improvements have been deleted herein for the sake of conciseness and readability but are properly within the scope of the following claims.

I claim:

1. A lining system including:
   A. A needle punched tubular substrate including a plurality of integrated thermoplastic fibers, said tubular substrate constructed of multiple overlapping layers that aren't attached one to another, wherein said tubular substrate is substantially resin-free;
   B. A bladder surrounded by said tubular substrate; and
   C. A film surrounding said tubular substrate.

2. The lining system of claim 1 wherein said thermoplastic fibers have a melt/flow point of approximately 300-342° F., a cure point of approximately 330-370° F., and bonding point of approximately 372-412° F. at approximately 5-20 psi.

3. The lining system of claim 2 wherein said tubular substrate further includes needle punched carbon fibers.

4. The lining system of claim 3 wherein said carbon fibers comprise approximately 10-60% by weight of said tubular substrate.

5. The lining system of claim 3 wherein said tubular substrate further includes needle punched aramid fibers.

6. The lining system of claim 5 wherein said aramid fibers comprise less than approximately 15% by weight of said tubular substrate.

* * * * *